Nov. 2, 1965 H. E. POULSON 3,215,128
ROTARY ENGINE
Filed June 17, 1963 2 Sheets-Sheet 1
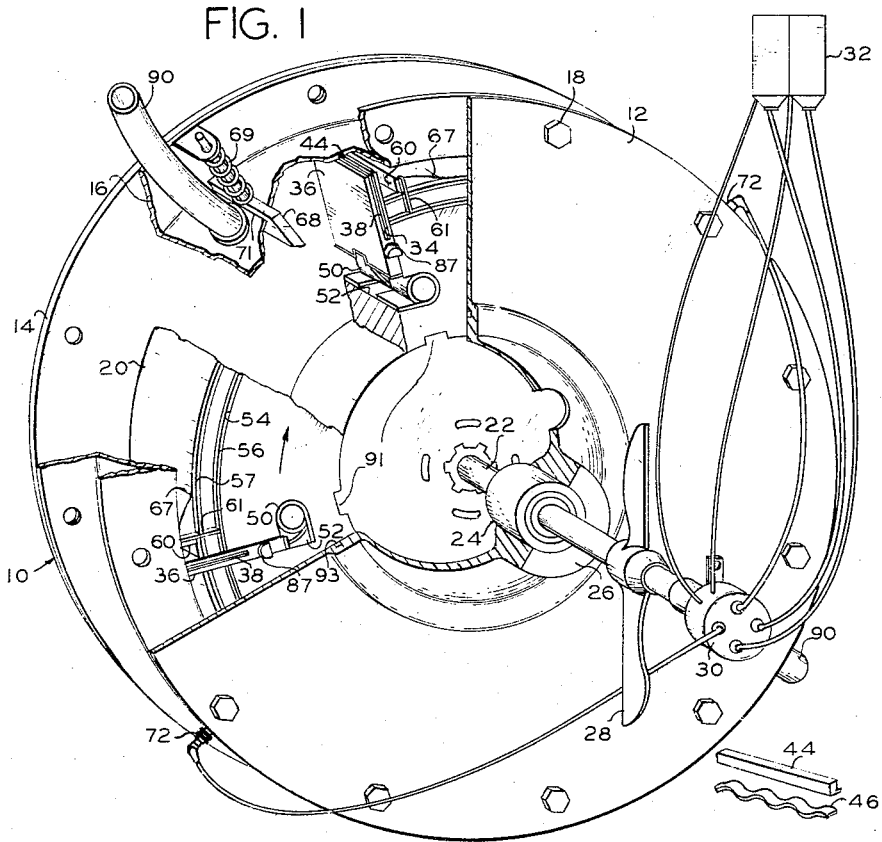
FIG. 1
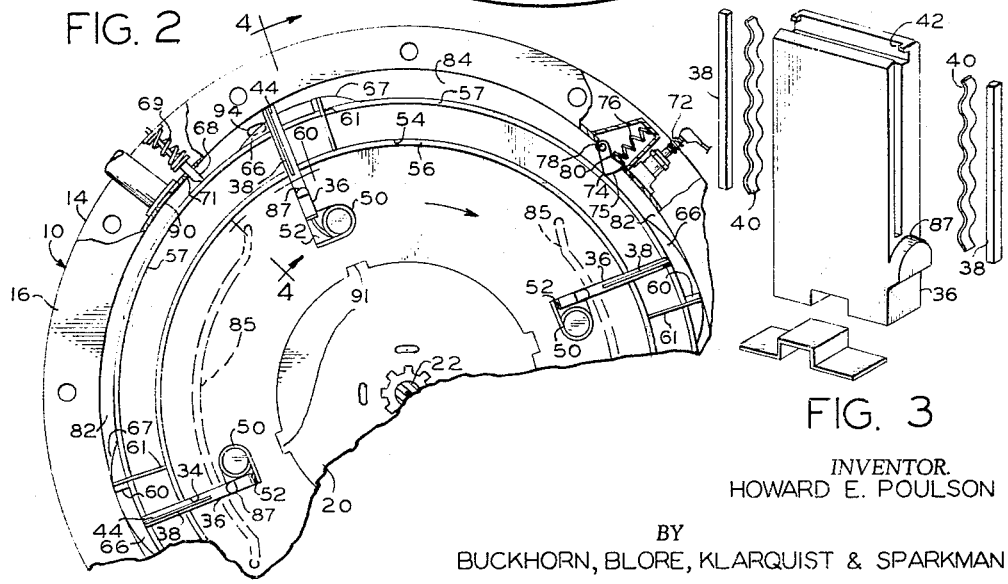
FIG. 2
FIG. 3
INVENTOR.
HOWARD E. POULSON
BY
BUCKHORN, BLORE, KLARQUIST & SPARKMAN
ATTORNEYS Nov. 2, 1965  H. E. POULSON  3,215,128
ROTARY ENGINE
Filed June 17, 1963  2 Sheets-Sheet 2
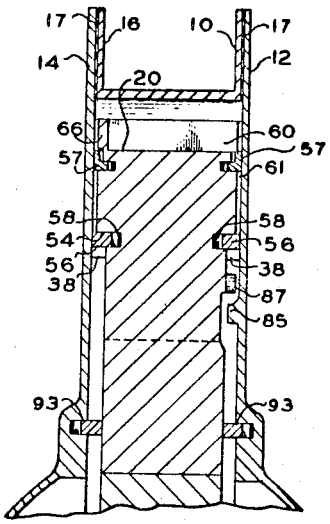
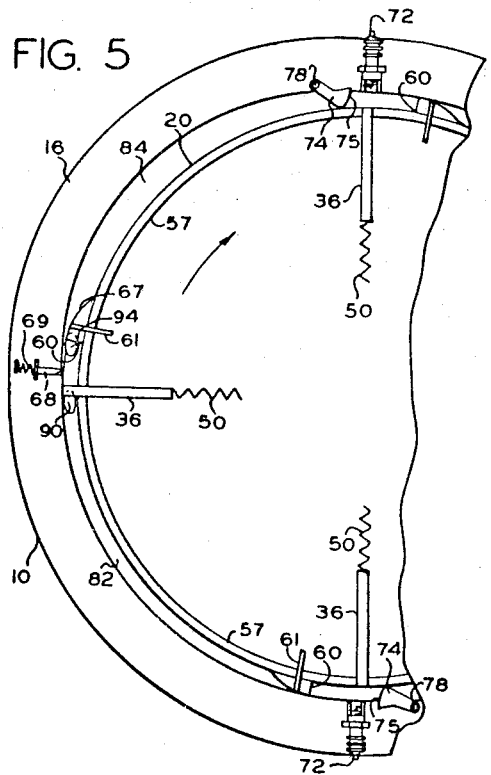
INVENTOR.
HOWARD E. POULSON
BUCKHORN, BLORE, KLARQUIST & SPARKMAN
ATTORNEYS

United States Patent Office 3,215,128
Patented Nov. 2, 1965

3,215,128
ROTARY ENGINE
Howard E. Poulson, Rte. 2, Box 52, Hermiston, Oreg.
Filed June 17, 1963, Ser. No. 288,221
8 Claims. (Cl. 123—15)

This invention relates to a rotary engine, and more particularly to a high torque rotary engine.

An object of the invention is to provide a rotary engine having piston walls rigid with the rotor.

Another object of the invention is to provide a high torque rotary engine.

A further object of the invention is to provide a rotary engine having a high compression ratio and a long power stroke.

Another object of the invention is to provide a rotary engine having a minimum number of moving parts.

A still further object of the invention is to provide a rotary engine in which all parts on the rotor subjected to high compressive forces are integral with the rotor.

The invention provides a rotary combustion engine having a rotor provided with a solid piston abutment wall thereon projecting from the periphery of the rotor together with a casing enclosing the rotor having a cylindrical portion of the same diameter as that of the abutment and an enlarged portion extending to the cylindrical portion thereof. The rotor also carries a movable vane behind the abutment and spaced circumferentially around the rotor from each abutment adapted to engage the outer periphery of the enlarged portion of the casing for drawing a gas-fuel mixture from an intake port into the portion thereof therebehind as it is rotated, and for compressing a mixture of air and fuel drawn into the portion of the chamber in front thereof, a movable cylinder head abutment member is carried pivotally by the casing and normally is urged into engagement with the periphery of the rotor at near the start of the cylindrical portion of the casing. A spark plug is positioned just ahead of the movable abutment member for igniting the fuel-air mixture just after the abutment member on the rotor has passed the spark plug. The spark plug fires the mixture between the solid abutment member of the rotor and the movable abutment member of the casing. The explosion moves the solid abutment member on through the cylindrical portion of the casing, at the end of which is positioned an exhaust port adapted to exhaust the spent mixture at the end of the power stroke. During the power stroke portion of the movement of the rotor, the vane is withdrawn into the rotor. After the firing stroke is completed, the vane is projected from the rotor and scavenges the spent gases. Then, the cycle described above is repeated.

A complete understanding of the invention may be obtained from the following detailed description of rotary engines forming specific embodiments thereof, when read in conjunction with the appended drawings, in which:

FIG. 1 is a perspective view with portions thereof broken away of a rotary engine forming one embodiment of the invention;

FIG. 2 is a fragmentary vertical sectional view of the rotary engine of FIG. 1;

FIG. 3 is an enlarged, exploded view of a vane of the engine of FIG. 1;

FIG. 4 is an enlarged, fragmentary, vertical sectional view taken along line 4—4 of FIG. 2; and FIG. 5 is a fragmentary, schematic view of the engine of FIG. 1.

Referring now in detail to the drawings, there is shown in FIGS. 1 to 5 a rotary engine having a casing or stator 10 including parallel side discs 12 and 14 secured to a channel-like peripheral member 16 by screws 18 with sealing gaskets 17 between the flanges of the member 16 and the outer portions of the discs 12 and 14. A rotor 20 is mounted rotatably in the casing 10 and is keyed to a shaft 22 mounted in bearings 24 carried by sleeve portions 26 of the side discs 12 and 14. The shaft 22 drives a cooling fan 28 and a breaker point mechanism 30 of known construction supplied with power from known ignition coils 32.

The rotor 20 is provided with generally radial, forwardly sloping slots 34 mounting vanes 36 therein which are provided with, as illustrated in FIG. 3, side sealing ring or bar members 38 backed up by springs 40 for sealing against the side discs 12 and 14, and also having a slot 42 for receiving a sealing ring or bar 44 urged outwardly by a spring 46 and designed to engage the inner periphery of the channel-like peripheral member 16. The vanes 36 are urged slightly forwardly and primarily radially outwardly relative to the rotor 20 by means of torsion springs 50 seated in recesses 52 at the sides of the slots 34 in the rotor 20. The rotor also is provided with annular grooves 54 as illustrated in FIG. 4, which receive arcuate sealing bars or rings 56 and 57 backed up by springs 58 for engaging the side discs 12 and 14 sealingly.

Radially projecting piston abutments 60 integral with the rotor 20 are provided at points spaced 90° apart on the cylindrical periphery of the rotor 20 and positioned somewhat in advance or clockwise around the casing from the vanes 36, as viewed in FIG. 2. Sealing ring members 61 are carried by the piston abutments 60. Cam members 66 integral with the rotor 20 are positioned coextensive with the abutments 60 and the vanes 36 for raising vanes 68 urged by springs 69 radially inwardly from the casing 10, the vanes 68 being guided in slots 71 in the periphery of the casing 10. The abutments 60 and cams 66 have wedge-shaped leading portions 67.

When each abutment 60 has just passed a spark plug 72, a movable, cylinder head abutment or vane 74 is permitted by the cam member 66 to be moved into engagement with the periphery of the rotor 20 by means of a spring 76 mounted in the member 16 in a recess 80 therein, the abutment 74 being mounted pivotally by a pin 78 in members 12 and 13. Each abutment 74 has an arcuate sealing face 75 and is pivotal between a position projecting into the casing and engaging the rotor and a position retracted completely out of the chamber in the casing into the recess 80 in the member 16. Each abutment 74 is positioned near the entrance end of a cylindrical portion 82 of the member 16, the cylindrical portions 82 being about 90° in extent and being separated by enlarged, generally elliptical portions 84 of the member 16. When the piston abutments 60 have just cleared the spark plugs 72, the spark plugs 72 are fired. This explodes a fuel-air mixture compressed between each piston abutment 60 and the adjacent movable cylinder head abutment 74, and drives the rotor 20 clockwise around the casing 10. The power strokes continue until the abutments 60 arrive at exhaust ports 90 positioned 180° apart and at the exit ends of the cylindrical portions 82 of the member 16, at which time the abutments 60 move past exhaust ports 90 and the spent gases are exhausted through the ports 90. While the abutment members 60 move in their power strokes, as just described, those of the vanes 36 positioned somewhat over 90° behind these operative abutments 60 are moving away from intake ports 94 in the casing 10 and draw fuel-air mixtures into the chambers behind these vanes. A known carburetor system (not shown) supplies the air and gasoline comprising the fuel-air mixture to the intake ports 94. This intake occurs from the movement of each vane 36 from the intake port 94 until the vane 36 arrives at the next succeeding cylindrical portion 82 of the member 16, at which time the next succeeding vane 36 closes off the inlet port 94.

However, the spaces between the enlarged curved portions 84 of the member 16 and the rotor are now filled with the fuel-air mixtures.

In the movement of each of the vanes 36 from the inlet port along the portions 84, in each addition to drawing in the gas-air mixture therebehind, each vane compresses the gas-air mixture positioned in the front thereof between it and the start of the next succeeding cylindrical portion 82 of the member 16, which is always closed by either the cylinder head abutment 74 which engages the periphery of the rotor 20, or by the piston abutment 60 as the piston abutment 60 travels under the pivoted abutment 74. The springs 76 are of sufficient strength to hold the compression of the fuel-air mixture. As the piston abutment 60 moves into the entrance of the cylindrical portion 82 of the member 16, the highly compressed fuel-air mixture ahead of the vane 36 just behind the piston abutment member 60 slips over the top of the piston abutment 60 into the space between the abutment 60 and the following vane 36 and is trapped therebetween. Then the cam 66 moves the abutment 74 back into the recess 80 to its retracted position, and the abutment 60 and the vane 36 move the compressed fuel-gas mixture past the abutment 74. Then, just as the vane 36 is moving along the cylinder head abutment 74, the cylinder head abutment is released by the cam 66 and retraction of the vane 36 is effected by cam rib 85. The abutment 74 maintains sealing engagement first with the vane 36 and then with the periphery of the rotor just behind the vane 36. Meanwhile the vane 36 is being retracted back into the rotor by the cam rib 85 (FIG. 2) fixed on the inner side of the disc 12 and engaging a cam follower 87 (FIG. 3) on the vane 36. The cam 66 holds the abutment 74 open until just before the spark plugs are supplied with ignition power. Thus, the fuel-air mixture is compressed from the space between the enlarged portion 84 and the portion of the periphery of the rotor opposite thereto into the short narrow space between the cylinder head abutment 74 and the piston abutment 60 positioned shortly thereahead, when the combustion occurs. Each firing or power stroke of each piston abutment 60 extends from a point just beyond the spark plugs 72 to the exhaust port 90. The vanes 68 are opened by the cams 66 also to provide clearance for the vanes 36 carried by the rotor 20. The piston abutments 60 being integral with the rotor 20, are able to withstand the high firing pressures.

Oil is supplied to the interiors of the rotor 20 and the casing 10 and travels radially outwardly through oil slots 91 to lubricate the moving parts of the rotor and casing. Rings 93 are carried by the casing 10 to limit outward flow of oil.

The above-described rotary engine is highly efficient and provides high torques. The engine has a high compression ratio, and requires a minimum of maintenance since the piston abutments on the rotor are integral with the rotor.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a rotary engine,
    a rotor having a radial piston abutment member thereon extending a predetermined distance from the axis of the rotor and also having a periphery spaced a lesser distance from the axis of the rotor,
    a casing having a first portion having a cylindrical peripheral portion having an inlet end and concentric with the rotor and of a radius equal to said predetermined distance and being provided with a second portion connected to the inlet end of the cylindrical portion and of a radius greater than said predetermined distance,
    a cylinder head abutment member carried by the casing at a predetermined point along the first portion and movable between a first position recessed in the casing to permit moving the piston abutment member past the cylinder head abutment member and a second position engaging the periphery of the rotor,
    means for introducing a fuel-gas mixture into the space between the casing and the rotor beyond the cylinder head abutment at the inlet end,
    a retractible vane carried by the rotor behind the piston abutment member with respect to the direction of rotor rotation for compressing the fuel-air mixture against the cylinder head abutment member and the piston abutment member as the piston abutment member enters the cylindrical portion of the casing,
    means for moving the cylinder head abutment member to the first position thereof as the piston abutment member is moved past the cylinder head abutment member and moving the cylinder head abutment member to the second position thereof as the vane is moved past the cylinder head abutment member,
    means for retracting the vane into the rotor after the vane is moved past the cylinder head abutment member,
    means for igniting the fuel-air mixture after the vane is retracted,
    and means for exhausting the mixture from the casing.

2. In a rotary engine,
    a casing having an arcuate first peripheral portion extending through a predetermined angle thereof of a predetermined diameter and also having a second peripheral portion at the end of the first peripheral portion of a diameter substantially larger than that of the first peripheral portion,
    a rotor having an integral piston extending to the first peripheral portion of the casing and not to the second peripheral portion,
    a movable vane carried by the rotor member and urged radially outwardly toward engagement with the peripheral portions of the casing and positioned behind the piston with respect to the direction of rotation of the rotor member for compressing a fuel-air mixture positioned ahead of the vane as the vane travels around the second peripheral portion of the casing,
    a cylinder head abutment in the casing movable between an operative position extending into the entrance portion of the first peripheral portion of the casing and a retracted position out of the casing,
    means for moving the vane away from the peripheral portion of the casing as the vane arrives at the cylinder head abutment,
    means urging the movable cylinder head abutment from the retracted position to the operative position thereof to define a combustion chamber with the piston and the portions of the casing extending therebetween,
    means for igniting the fuel-air mixture in the combustion chamber,
    and means for exhausting the mixture from the casing.

3. In a rotary engine,
    a casing having a pair of opposite cylindrical portions each extending through a predetermined angle thereof and of a predetermined radius and centered on an axis and also having a pair of opposite enlarged peripheral portions extending between and blending to the cylindrical portions and each being spaced from the axis substantially farther than said predetermined radius,
    a rotor rotatable on said axis in a predetermined direction and having a plurality of spaced piston abutments each extending to the cylindrical portions of the casing and a periphery substantially less than and spaced inwardly from the enlarged peripheral portions, a pair of intake ports each positioned at one end of one of the enlarged peripheral portions, a pair of exhaust ports each positioned adjacent one of the pair of intake ports, a pair of retractible casing vanes each positioned between one of the exhaust ports and one of the intake ports, the rotor being provided with a plurality of slots each spaced behind with respect to the direction of rotation of the rotor and from one of the piston abutments, a plurality of movable rotor vanes carried by the rotor member in the slots thereof and urged radially outwardly toward engagement with the periphery of the casing for simultaneously compressing a fuel-air mixture positioned ahead of it and for drawing in a fuel-air mixture from one of the intake ports positioned behind the vane as the vane travels around the enlarged portion of the casing, a pair of cylinder head abutments each mounted in the casing near the junction of the other ends of the cylindrical portion and the enlarged peripheral portion of the casing and movable between an operative position closing the space between the periphery of the rotor member and the casing and a retracted position not closing the space between the periphery of the rotor member and the casing, means for moving each rotor vane away from the peripheral portion of the casing as that vane is moved past one of the cylinder head abutments, means urging the cylinder head abutments from the retracted positions to the operative positions thereof to define combustion chambers with the piston abutments and the walls of the casing extending therebetween, means for igniting the fuel-air mixtures in the combustion chambers, and means for exhausting the mixtures from the combustion chambers.

4. The rotary engine of claim 3 including a plurality of cams carried by the rotor member for moving the cylinder head abutments to the retracted positions thereof as the piston abutments and rotor vanes are moved past the cylinder head abutments.

5. The rotary engine of claim 4 wherein the means for moving the rotor vanes away from the peripheral portion of the casing comprise a plurality of cam followers on the rotor vanes, and a plurality of cams on the casing for engaging the cam followers to retract the rotor vanes as the rotor vanes are moved past the cylinder head abutments.

6. The rotary engine of claim 5 wherein a plurality of cams on the rotor also move the casing vanes to retracted positions as the piston abutments are moved therepast.

7. The rotary engine of claim 3 including a plurality of sealing means carried by the vanes.

8. In a rotary engine, a generally cylindrical casing having a pair of cylindrical portions each of substantially 90° extent and of a predetermined diameter, each cylindrical portion having an entrance end and an exit end, the casing also being provided with enlarged arcuate portions extending between the ends of the cylindrical portions thereof and each arcuate portion having an entrance end adjacent the exit end of one of the cylindrical portions and an exit end adjacent the entrance end of the other cylindrical portion, the casing also having a pair of exhaust ports spaced 180° apart near the exit ends of the cylindrical portions and a pair of intake ports spaced from and adjacent to the exhaust ports and positioned at the entrance ends of the arcuate portions, the casing being provided with a pair of recesses at the entrance ends of the cylindrical portions, a pair of movable cylinder head abutments mounted pivotally in the recesses for movement between retracted positions withdrawn into the recesses and operative positions extending into the casing, compression springs urging the cylinder head abutments toward the operative positions thereof, a rotor member provided with a generally cylindrical periphery of a radius substantially less than that of the cylindrical portions of the casing, the rotor being provided with four integral radial piston abutments projecting beyond the periphery thereof at points spaced substantially 90° apart, the abutments extending outwardly from the periphery of the rotor to the cylindrical portions of the periphery and being movable along the cylindrical portions of the periphery of the casing in substantially sealed engagement therewith, the rotor also being provided with a plurality of substantially radial slots therein extending inwardly from the periphery thereof at points spaced slightly behind the solid abutments with respect to the direction of rotor rotation and also having a plurality of cams formed by peripheral portions of the piston abutments with respect to the direction of rotor rotation for moving the cylinder head abutments to their recessed positions as the piston abutments move past the cylinder head abutments, a plurality of vanes mounted slidably in the slots in the rotor, spring means mounted in the rotor urging the vanes outwardly along the slots, the casing being provided with cam means for holding the vanes in retracted positions withdrawn into the slots as the vanes are moved past the cylinder head abutments and permitting the vanes to be moved outwardly into engagement with the periphery of the casing after firing strokes of the piston abutments have been completed, the casing being provided with radially extending slots positioned between the intake and exhaust ports, vane means mounted slidably in the slots in the casing, and spring means urging the vane means radially inwardly toward engagement with the periphery of the rotor, the piston abutment cams also moving the vane means out of the casing as the piston abutments and vanes are moved therepast.

References Cited by the Examiner

UNITED STATES PATENTS

| | | | |
|---|---|---|---|
| 1,922,363 | 8/33 | Hapkins | 123—16 |
| 2,175,265 | 10/39 | Johnson | 123—15 |
| 2,762,346 | 9/56 | White | 123—15 |

FOREIGN PATENTS 450,765   7/36   Great Britain.

KARL J. ALBRECHT, *Primary Examiner.*

JOSEPH H. BRANSON, Jr, *Examiner.*